United States Patent [19]

Coulter

[11] Patent Number: 5,267,722
[45] Date of Patent: Dec. 7, 1993

[54] VALVE WITH DUAL DUROMETER BALL SEAL

[75] Inventor: John H. Coulter, Oakland, Calif.

[73] Assignee: Grove Valve and Regulator Company, Oakland, Calif.

[21] Appl. No.: 958,689

[22] Filed: Oct. 9, 1992

[51] Int. Cl.⁵ ............................................. F16K 5/06
[52] U.S. Cl. ............................................. 251/315 R
[58] Field of Search ........................................ 251/315

[56] References Cited

U.S. PATENT DOCUMENTS

| | | | |
|---|---|---|---|
| 3,269,692 | 8/1966 | Shafer | 251/315 X |
| 3,508,738 | 4/1970 | Atkinson et al. | 251/315 |
| 4,163,544 | 8/1979 | Fowler et al. | 251/364 X |
| 4,477,055 | 10/1984 | Partridge | 251/315 X |
| 4,815,701 | 3/1989 | Stone | 251/315 X |

Primary Examiner—John C. Fox
Attorney, Agent, or Firm—Flehr, Hohbach, Test, Albritton & Herbert

[57] ABSTRACT

A ball valve having a valve body, a ball mounted in the valve body and mounting means for the valve body and the ball whereby the ball may be rotated between an open position allowing flow of fluid through the mounting means, the body and the ball and a closed position preventing such flow. The mounting means is fitted on each side of the ball and body with a seat ring and resilient means urging the seat ring toward the ball and is formed with a pair of grooves encircling the opening in the body. A seal ring is seated in each of such grooves, one such ring being hard and better suited to seal under high pressure, the other ring being softer and better suited to seal under low pressure, and to conform to irregularities in the surface of the ball. Preferably the pair of grooves on each side of the ball have an edge in common and the hard seal ring protrudes from its groove and under pressure deforms the softer ring and augments its sealing function.

2 Claims, 3 Drawing Sheets

5,267,722

VALVE WITH DUAL DUROMETER BALL SEAL

This invention relates to a seal for a ball valve, more particularly for a ball valve useful in a pipeline for transmission of oil and gas.

BACKGROUND OF THE INVENTION

In valves such as ball valves intended for use under high pressure conditions, for example in pipelines for transmission of oil and gas, it is often necessary to employ a seal, for example in the form of an O-ring, which is very hard, being made, for example, of Nylon. Such seals present difficulties. For example at low pressure the very hard or high durometer sealing ring may not conform properly to irregular surfaces due to imperfections in the manufacture of the ball or to irregularities in the surface arising out of usage.

On the other hand relatively soft, so-called elastomeric seals are inadequate for high pressure use because they tend to be extruded and can be dislodged from the sealing gland by pressure.

OBJECTS OF THE INVENTION

It is an object of the invention to provide a ball valve having sealing means which is adequate under high pressure and low pressure conditions.

It is a further object of the invention to provide an improved sealing means for ball valves suitable for high and low pressure conditions which is able to conform to irregularities and imperfections in the spherical surface of the ball.

The above and other objects will be apparent from the ensuing description and the appended claims.

DESCRIPTION OF THE PREFERRED EMBODIMENTS

Figure 1:
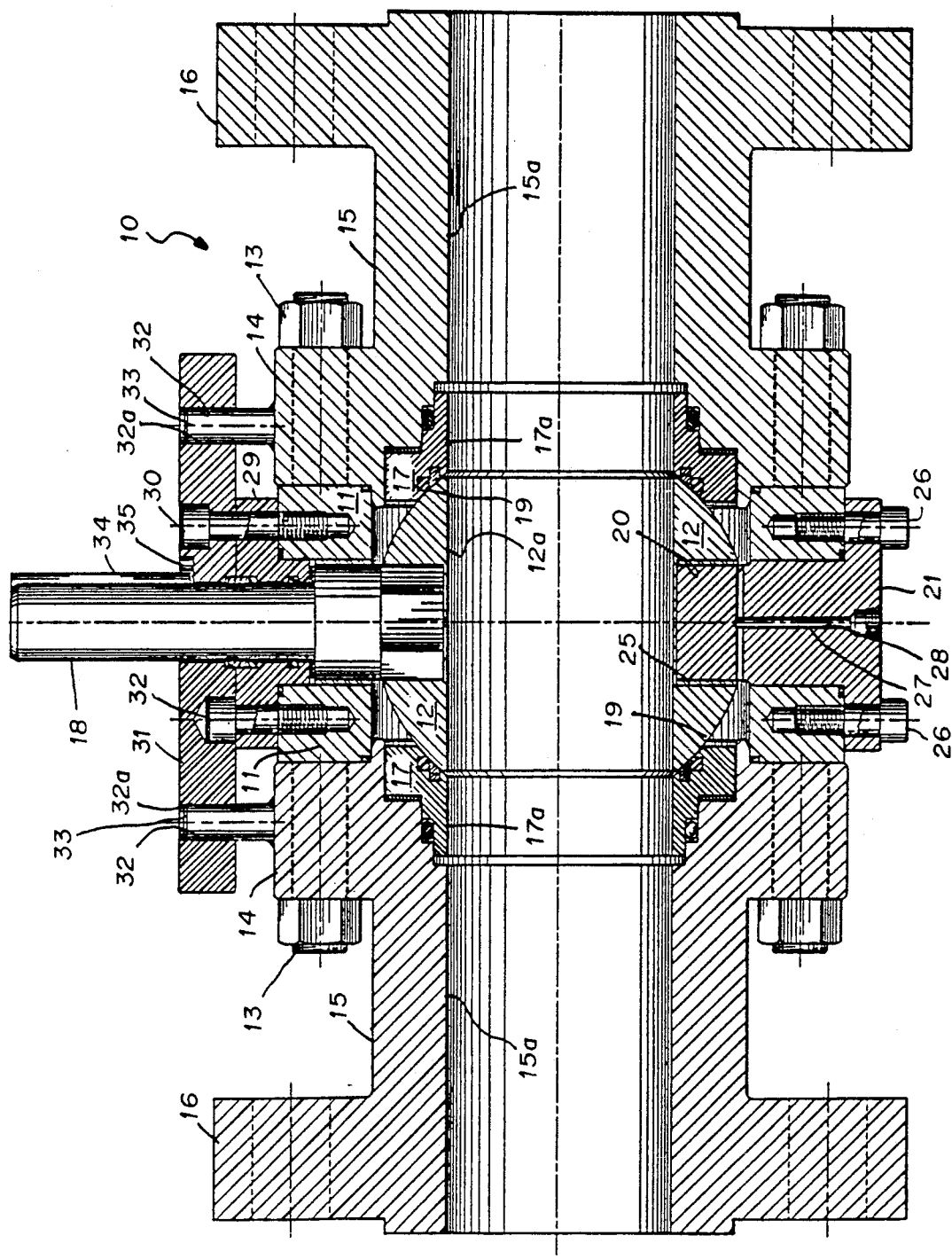
FIG. 1 is a view in vertical mid-section through the valve of the invention showing it secured in place in a pipeline.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The valve is generally designated by the reference numeral 10 and it comprises a valve body 11 and a ball 12. The valve body 11 is made in two identical parts, each of which is bolted at 13 to a flange 14 on a closure 15 which has a flange 16 at its other end for bolting onto a pipeline (not shown). The closure members 15, the ball 12 and seat rings 17 have matching bores 15a, 12a and 17a, respectively. The ball 12 has a stem 18 for turning it, and is formed with spherical sectors at 19.

The ball is supported as follows: it is seated in seat rings 17 and at its lower end it is provided with an opening 20 to receive a lower trunnion 21, a bearing 25 being interposed between the ball and the trunnion. The trunnion 21 is bolted at 26 to the body 11. A passage 27 branching as shown is provided, having a threaded opening 28 which is normally plugged and may be opened to relieve pressure or drain the body cavity when needed.

At its opposite end the ball 12 is provided with a gland plate 29 bolted at 30 to the body 11, and an adapter plate 31 is bolted at 32 to the gland plate 29 and the body 11 and is provided with holes 32a which receive anchor pins 33 projecting from the flanges 14. The stem 18 is provided with a key 34 to key it to a valve actuator which may be manual or motorized. A slot 35 in plate 31 receives the lower end of the key 34 and permits limited rotation of the stem 18 and of the ball 12 sufficient to completely open the valve and to completely shut it off. Seals and bearings are provided as shown.

Sealing of the valve when it is in closed position is provided by seat rings 17 and associated seals which will now be described.

Figure 2A:
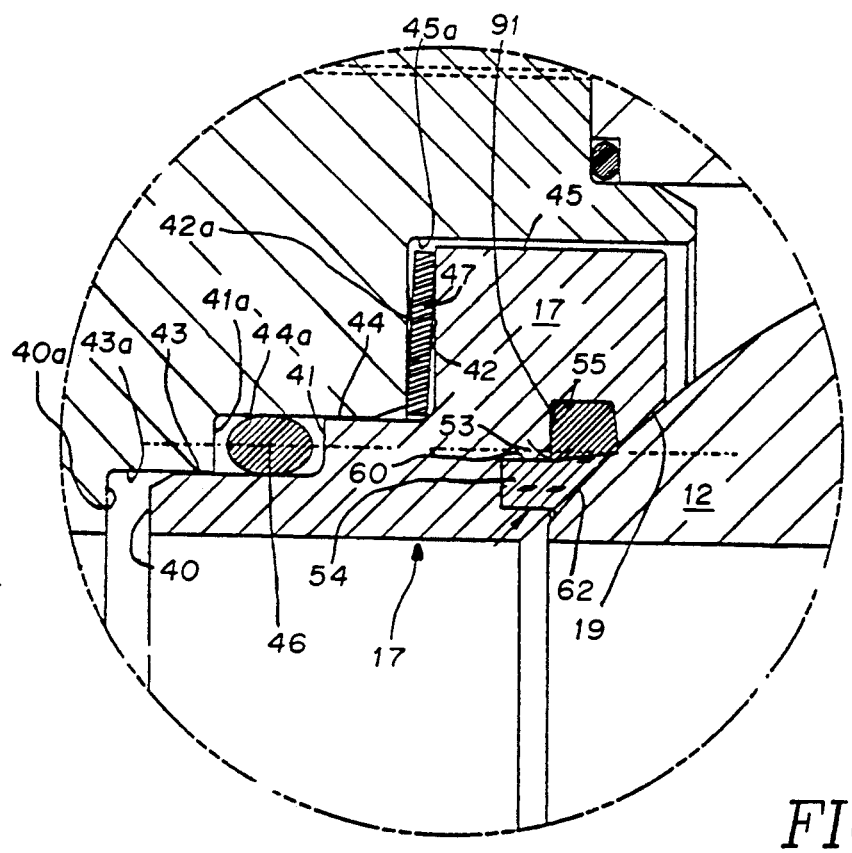
FIG. 2A is a blow-up of the circled portion in FIG. 2.
Figure 2:
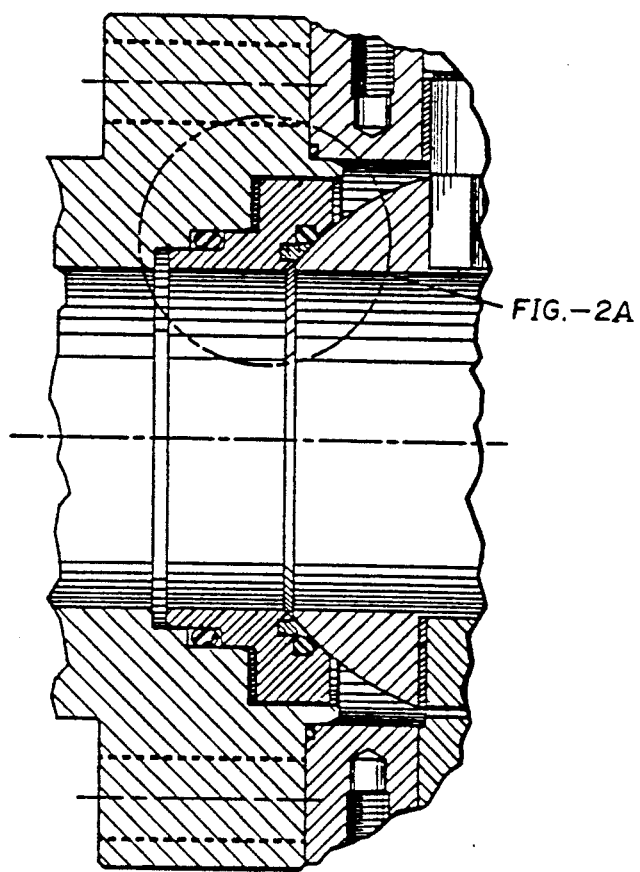
FIG. 2 is a view on a larger scale than that of FIG. 1 showing the sealing mechanism employed with the valve.
Figure 3:
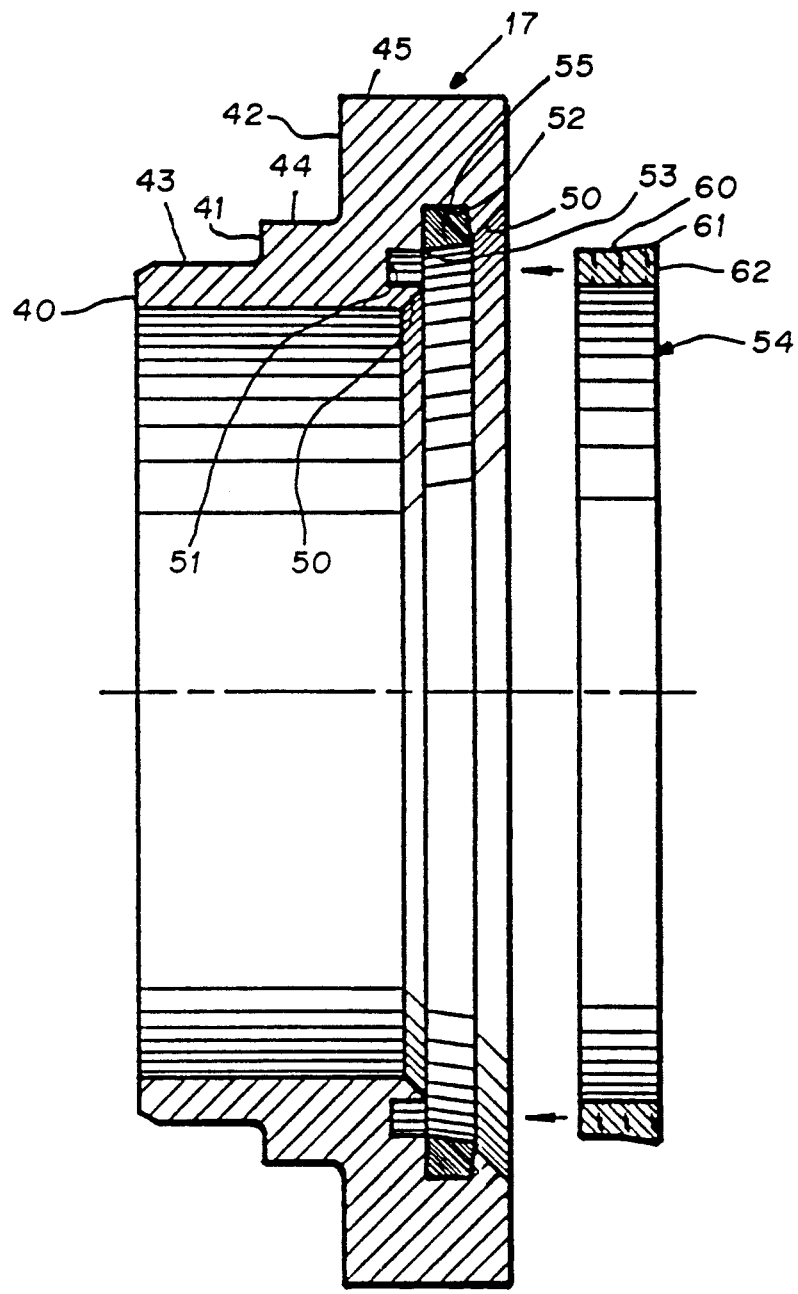
FIG. 3 is a view in vertical mid-section through the seat ring employed in the valve of FIGS. 1 and 2 and also showing the sealing rings employed with the seat ring.

Referring to FIG. 3, one of the two seat rings 17 is shown. It is formed of carbon, alloy or corrosion resistant steel and to its rear, away from the ball 12, it has a stepped configuration to conform to the stepped configuration of the respective closure 14 (see FIGS. 2 and 2A). Thus the seat ring 17 has vertical faces 40, 41 and 42 and cylindrical faces 43, 44 and 45 conforming, respectively, to faces 40a, 41a, 42a, 43a, 44a and 45a, respectively, of flange 14. (See FIGS. 2 and 2A) An O-ring seal 46 is provided between faces 43 and 43a, and a spring is provided at 47 between faces 42 and 42a which thrusts the seat ring forwardly toward the ball 12.

As noted above, the ball 12 is formed with spherical sectors 19. It is against these sectors that the sealing means seals. Referring to FIG. 3 the inner face of the seat ring 17 is machined to form a slanting sector 50 at a 45° angle to the horizontal axis of the ring, and between the extremities of this face the ring 17 is formed with a first groove 51 which is parallel to the longitudinal axis of the ring 16 and with a second groove 52 which is at a 90° angle to such axis. The two grooves 51 and 52 have edges which meet at 53. See also FIG. 2A.

The groove 51 is fitted with a hard plastic seal ring 54 and the groove 52 is fitted with a softer elastomeric seal ring 55. Typically the hard ring 54 is of nylon construction also known as an engineered plastic, and has typically a hardness on the Rockwell Scale of R90, for example a product of Norton Chemplast, Wayne, N.J. known as Vekton 6XAU. Other materials may be used which satisfy certain requirements such as resistance to extrusion at 3700 PSIG. The seal 55 is preferably what is known as an elastomeric seal having a Shore A durometer rating of 95 to 100. A material available on the market is Dupont Viton GLT formulated to provide a durometer hardness of 95-100 Shore A.

The configuration, hardness and geometry of the seal rings 54 and 55 are important. As shown in FIGS. 2A and 3, the seal ring 54 has along its face 60 closest to the seal ring 55 an outward taper terminating in a tip 61. It also has a slanting face 62 which seats against the spherical sector of the ball 12. Pressure induced by the mechanical fit of the seal ring 54 and the ball 12 and by fluid pressure in the pipeline distort the seal ring 54 toward the seal ring 55. Since only a small area of the seal ring 55 is subject to deflection, the tip 61 of seal 54 will distort the ring 55 and will cause it to press hard against the spherical sector of the ball 12, thereby forming a bubble tight seal at both lower and high pressures.

The hard seal ring 54 is adapted to seal at high pressures, e.g., 3700 psig. The softer seal ring 55 is adapted to seal at lower pressures, e.g., 80 psig. Also the softer seal ring 55 is better suited than the hard ring 54 to conform to irregularities in the spherical sectors 19 of the ball 12 due to errors in fabrication and/or to abrasion resulting from solid particles entrained in the fluid flowing in the pipeline. Also the shape of the hard ring 54, that is the protruding tapered portion terminating in the tip 61 makes it flexible and therefore more apt to conform to irregularities in the spherical sectors 19 of the ball.

To eliminate trapping of pressure behind the seal ring 54 when it is inserted into the groove 51, scratches may be made along its surface 60 to allow escape of air during fitting. The seal rings 54 are confined at all times by the grooves 52 and the seal rings 55. Therefore it is unnecessary to provide vent holes to the ambient atmosphere to prevent blowout of this ring.

The spring 47 acts when there is no pressure to urge the seal rings 54 and 55 against the ball 12. When there is pressure in the line the piston areas on both sides of the ball are such as to maintain a positive seal on both sides of the valve. A piston effect is provided as described in Grove and Bryant U.S. Pat. No. 2,796,200 to urge the seat rings 17 against the ball 12 in open, closed or intermediate positions of ball 12 and irrespective of whether pressure in the flow passage exceeds that in the valve body or pressure in the valve body exceeds that in flow passage.

It will therefore be apparent that a novel and useful ball valve seal has been provided.

I claim:

1. In a ball valve construction including a ball, a body housing the ball for rotation between an open position and a closed position, and means mounting the ball in the body for such rotation, said ball, body and mounting means having flow passages which are aligned when the ball is in its open position for flow of fluid through the valve, the improvement which comprises:

(a) seat rings mounted in said mounting means, one on each side of the ball, to encircle the flow passage in the ball when it is in open position, together with spring means urging said seat ring toward the ball, each said seat ring having a face closest to the ball, such face being shaped to approximate the adjacent surface of the ball, such face being formed with a first 360° groove which is parallel to the direction of flow of fluid through the valve, said face being also formed with a second 360° groove radially outwardly of the first groove and perpendicular to the first groove, said first and second grooves having an edge in common.

(b) a first seal ring of hard composition capable of sealing at high pressure, said first seal ring being lodged in said first groove, projecting from said groove and presenting a slanting face conforming generally to the surface of the ball, (c) a second seal ring of softer construction capable of sealing at lower pressures and conforming to irregularities in the surface of the ball, said second seal ring being lodged in said second groove and having an exposed face abutting the tapered portion of said first seal ring, said second seal ring being confined in its groove by said first ring, having only a small area in contact with the ball and subject to distortion in the direction of the ball by distortion of the projecting portion of the first seal ring.

2. The ball valve construction of claim 1 in which the second seal ring completely fills the second groove.

* * * * *